Dec. 9, 1924.
A. ONODY
1,518,216
DISH AND DISH COVER RACK
Filed Jan. 5, 1924
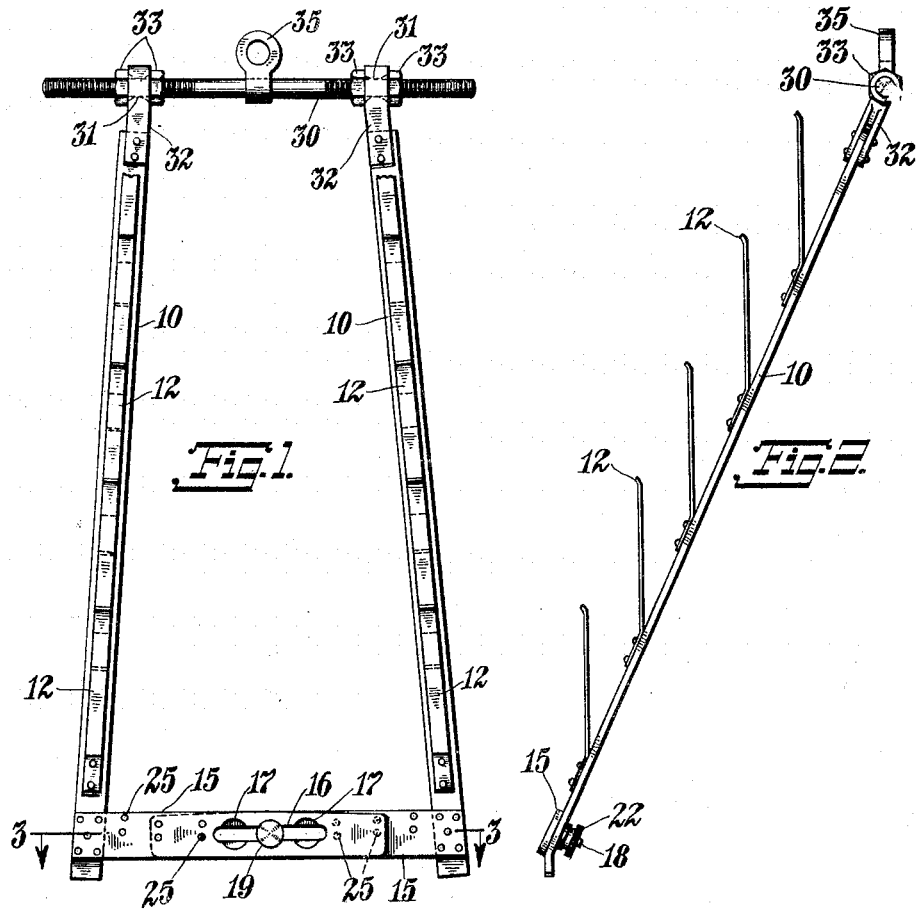
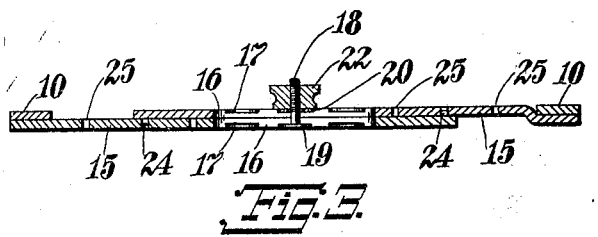
INVENTOR
Albert Onody.
BY
ATTORNEY Patented Dec. 9, 1924.

1,518,216

UNITED STATES PATENT OFFICE.

ALBERT ONODY, OF CLEVELAND, OHIO.

DISH AND DISH-COVER RACK.

Application filed January 5, 1924. Serial No. 684,576.

*To all whom it may concern:*

Be it known that I, ALBERT ONODY, citizen of the United States, residing at Cleveland, in the county of Cuyahoga and State of Ohio, have invented certain new and useful Improvements in Dish and Dish-Cover Racks, of which the following is a specification.

This invention relates to a dish rack adapted to hold plates, saucers and the like while the same are drying, the invention having for an object the provision of a novel and simple device of this sort, in which the dishes may be held at an angle to the horizontal, and in spaced relation from one another, a further specific object relating to the making of the device adjustable.

For further comprehension of this invention, and of the objects and advantages thereof, reference will be had to the following description and accompanying drawing, and to the appended claim in which the various novel features of the invention are more particularly set forth.

Fig. 1 of the drawing is a face view of my improved dish rack.

Fig. 2 is a side view thereof.

Fig. 3 is a horizontal sectional view taken on the line 3—3 of Fig. 1.

As here shown my improved dish rack comprises a frame element consisting of a pair of flat side bars 10 which are joined together at their ends by cross-pieces to be presently described. When the rack is intended for use in drying a miscellaneous set of dishes these bars will be retained in an inclined relation with respect to one another so that various size dishes may be supported thereon. Projecting upwardly from these bars, and at an acute angle thereto, are rows of fingers 12 which may be conveniently formed from metal straps riveted at one end to the said bars. The respective fingers on the two bars are horizontally alined with relation to one another, that is to say the fingers are arranged in pairs on the respective bars. The dishes to be dried are placed on the bars between the pairs of fingers which latter retain the dishes against displacement. The rack is preferably arranged at a general inclination to the vertical as shown most clearly in Fig. 2, with the fingers, 12 substantially vertical.

In order to permit of relative adjustment of the bars 10 to suit varying sets of dishes the cross-pieces which unite these bars may be constructed in a novel manner for this purpose. As here shown the lower cross-piece comprises a pair of bar elements 15 which are riveted at one end to the respective bars 11 and which overlap one another. These elements 15 are formed with registering longitudinal slots 16 and with additional shallow sockets 17 spaced therealong and intersected by the said slots. Extending transversely through the said slots 16 is a pin 18 which has a flat head 19 on one end of a size to fit snugly in either of the sockets in one bar element and which is freely surrounded by a washer 20 of a size likewise to fit in the other bar element in the socket 17, this pin being formed on its end with threads and having a nut 22 threaded thereon and which acts to clamp the two bar elements 15 together. To ensure against relative movement of the said bar element around the pin 18 these elements are each provided on one end with a stud 24 which is adapted to take into any one of a number of apertures 25 in the other bar element. These apertures are arranged in pairs, the said pairs being spaced along the bar elements in correspondence to the spacing of the sockets 17, while the respective apertures of each pair are spaced from one another along lines concentric to the different sockets. As will be apparent, the total width of the rack may be varied without variation of the relative angles of the side bars 10, by straight line adjustment of the elements 15 upon one another, and a shifting of the parts 19 and 20 from one registering pair of sockets 17 to another, or the bars can be swung to assume a parallel position, and locked in said position, by loosening the nut 22 and swinging the elements 15 upon the pin, to shift the pins from one aperture 25 of each pair to the other one of the pair, or a combination of these adjustments can be made. The top bar is here formed of a rod 30 which is threaded at each end these ends passing freely through enlarged apertures 31 in eye elements 32 fixed to the tops of the bars 10, nuts 33 being threaded on the said rod and bearing on the said eye elements to lock the said bars to the top rod. This rod is shown as formed midway between its ends with an eye 35 for suspending the rack.

Having thus described my invention what I claim as new and desire to protect by let- ters Patent of the United States is as follows:

A dish rack comprising a frame element having side bars, and fingers projecting from said side bars, a cross-piece uniting one end of said bars and comprising overlapping bar elements fixed at remote ends to the respective bars, said overlapping elements being formed with longitudinal slots, and sockets spaced therealong and intersected by said slots, a pin passing through said slots and having on one end a head adapted to fit snugly in either of the sockets on one of said elements, a washer on said pin adapted to fit snugly in either of the sockets in the other element, and a nut threaded on the said pin for clamping the two bar elements to one another, said bar elements each having pairs of apertures spaced therealong in correspondence to the said sockets with the respective apertures of the several pairs concentric with common sockets and studs carried in the ends of the said elements adapted to engage in either of said apertures.

In testimony whereof I have affixed my signature.

ALBERT ONODY.